(12) United States Patent
Percival et al.

(10) Patent No.: US 11,685,836 B2
(45) Date of Patent: Jun. 27, 2023

(54) CROSS-LINKABLE NANOCOMPOSITE ANTICORROSION COATING

(71) Applicant: National Technology & Engineering Solutions of Sandia, LLC, Albuquerque, NM (US)

(72) Inventors: Stephen John Percival, Albuquerque, NM (US); C. Garrett Campbell, Albuquerque, NM (US); Mathias C. Celina, Albuquerque, NM (US); Erik David Spoerke, Albuquerque, NM (US); Eric John Schindelholz, Columbus, OH (US)

(73) Assignee: National Technology & Engineering Solutions of Sandia, LLC, Albuquerque, NM (US)

( * ) Notice: Subject to any disclaimer, the term of this patent is extended or adjusted under 35 U.S.C. 154(b) by 254 days.

(21) Appl. No.: 17/029,630

(22) Filed: Sep. 23, 2020

(65) Prior Publication Data

US 2021/0292572 A1  Sep. 23, 2021

Related U.S. Application Data

(60) Provisional application No. 62/990,704, filed on Mar. 17, 2020.

(51) Int. Cl.
  *C09D 5/08* (2006.01)
  *C09D 7/40* (2018.01)
  (Continued)

(52) U.S. Cl.
  CPC ............ *C09D 5/084* (2013.01); *B05D 7/148* (2013.01); *B05D 7/542* (2013.01); *C09D 7/70* (2018.01);
  (Continued)

(58) Field of Classification Search
  CPC ........ C09D 5/084; C09D 7/70; C09D 139/02; C09D 163/00; C09D 179/02; B05D 7/148;
  (Continued)

(56) References Cited

U.S. PATENT DOCUMENTS

| | | | | |
|---|---|---|---|---|
| 6,080,334 A | * | 6/2000 | Heimann | C23F 11/00 427/397.8 |
| 7,666,954 B2 | * | 2/2010 | Walker | C08G 59/50 525/523 |

(Continued)

OTHER PUBLICATIONS

Kim et al. "Photo-induced release of active plasmid from cross-linked nanoparticles: o-nitrobenzyl/methacrylate functionalized polyethyleneimine" J. Mater. Chem. 2010, 20, 3396-3403. (Year: 2010).*

(Continued)

*Primary Examiner* — Robert S Walters, Jr.
(74) *Attorney, Agent, or Firm* — Kevin W. Bieg

(57) ABSTRACT

Nanocomposite anticorrosion coating can be achieved by depositing alternating, multilayers of a cross-linkable polymer and dispersed and aligned inorganic platelets followed by cross-linking of the cross-linkable polymer. The cross-linkable polymer can be an externally cross-linkable polymer that is cross-linked by diffusing a cross-linking agent into the deposited multilayer coating. Alternately, the cross-linkable polymer can be a functionalized cross-linkable polymer that is cross-linked by self-curing, thermal heat curing, or light (e.g., UV) following deposition of the multilayer coating.

9 Claims, 11 Drawing Sheets

(51) Int. Cl.

| | |
|---|---|
| C09D 179/02 | (2006.01) |
| C09D 139/02 | (2006.01) |
| B05D 7/14 | (2006.01) |
| B05D 7/00 | (2006.01) |
| C23F 11/173 | (2006.01) |
| C09D 163/00 | (2006.01) |
| C08K 7/00 | (2006.01) |
| C08K 3/34 | (2006.01) |

(52) U.S. Cl.
CPC ......... *C09D 139/02* (2013.01); *C09D 163/00* (2013.01); *C09D 179/02* (2013.01); *C23F 11/173* (2013.01); C08K 3/346 (2013.01); C08K 7/00 (2013.01)

(58) Field of Classification Search
CPC ....... B05D 7/542; C23F 11/173; C08K 3/346; C08K 7/00
See application file for complete search history.

(56) References Cited

U.S. PATENT DOCUMENTS 10,150,873 B2 12/2018 Schindelholz et al.
2018/0298200 A1* 10/2018 Schindelholz ....... C09D 139/02

OTHER PUBLICATIONS

Percival et al. "Nanoscale thin film corrosion barriers enabled by multilayer polymer clay nanocomposites" Surface & Coatings Technology 383 (2020) 125228, available online Dec. 2019. (Year: 2019).*
Tong et al. "Stable Weak Polyelectrolyte Microcapsules with pH-Responsive Permeability" Macromolecules 2006, 39, 335-340. (Year: 2006).*
Douville "Passivation basics: Will this stainless steel rust?" published online Nov. 11, 2018 at https://www.thefabricator.com/thefabricator/article/testingmeasuring/passivation-basics-will-this-stainless-steel-rust-.*
Nguyen, Q. T. et al., "Preparation of Polymer-Clay Nanocomposites and Their Properties", Advances in Polymer Technology (2006) vol. 25, pp. 271-285.
Cussler, E.L. et al., "Barrier Membranes," Journal of Membrane Science (1988), vol. 38, pp. 161-174.
Ebina, T. and Mizukami, F., "Flexible Transparent Clay Films with Heat-Resistant and High Gas-Barrier Properties," Advanced Materials (2007), vol. 19, pp. 2450-2453.
Schindelholz, E.J. et al., "Extraordinary Corrosion Protection from Polymer-Clay Nanobrick Wall Thin Films," ACS Applied Materials Interfaces (2018), vol. 10, pp. 21799-21803.
Qin, S. et al., "Ultrathin Transparent Nanobrick Wall Anticorrosion Coatings," ACS Applied Nano Materials (2018), vol. 1, pp. 5516-5523.
Guin, T. et al., "Thick Growing Multilayer Nanobrick Wall Thin Films: Super Gas Barrier with Very Few Layers," Langmuir (2014), vol. 30, pp. 7057-7060.
Hagen, D.A. et al., "Controlling Effective Aspect Ratio and Packing of Clay with pH for Improved Gas Barrier in Nanobrick Wall Thin Films," ACS Applied Materials & Interfaces (2014), vol. 6, pp. 22914-22919.
Hagen, D.A. et al., "High Gas Barrier Imparted by Similarly Charged Multilayers in Nanobrick Wall Thin Films," RSC Advances (2014), vol. 4, pp. 18354-18359.
Decher, Gero, "Fuzzy Nanoassemblies: Toward Layered Polymeric Multicomposites," Science (1997), vol. 277, pp. 1232-1237.
Zhang, D. et al., "Flame Retardant and Hydrophobic Coatings on Cotton Fabrics via Sol-Gel and Self-Assembly Techniques," Journal of Colloid and Interface Science (2017), vol. 505, pp. 892-899.
Zhang, Y. et al., "Thin Nacre-Biomimetic Coating with Super-Anticorrosion Performance," ACS Nano (2018), vol. 12, pp. 10189-10200.
Faure, E. et al., "Clay and DOPA Containing Polyelectrolyte Multilayer Film for Imparting Anticorrosion Properties to Galvanized Steel," Langmuir (2012), vol. 28, pp. 2971-2978.
Richardson, J.J. et al., "Innovation in Layer-by-Layer Assembly," Chemical Reviews (2016), vol. 116, pp. 14828-14867.
Liu, S. et al., "Corrosion Resistance of Graphene-Reinforced Waterborne Epoxy Coatings," Journal of Materials Science & Technology (2016), vol. 32, pp. 425-431.
Shi, X. et al., "Effect of nanoparticles on the anticorrosion and mechanical properties of epoxy coating," Surface & Coatings Technology (2009), vol. 204, pp. 237-245.

* cited by examiner

CROSS-LINKABLE NANOCOMPOSITE ANTICORROSION COATING

CROSS-REFERENCE TO RELATED APPLICATION

This application claims the benefit of U.S. Provisional Application No. 62/990,704, filed Mar. 17, 2020, which is incorporated herein by reference.

STATEMENT OF GOVERNMENT INTEREST

This invention was made with Government support under Contract No. DE-NA0003525 awarded by the United States Department of Energy/National Nuclear Security Administration. The Government has certain rights in the invention.

FIELD OF THE INVENTION

The present invention relates to anticorrosion coatings and, in particular, to a cross-linkable nanocomposite anticorrosion coating.

BACKGROUND OF THE INVENTION

Coatings and film-based barriers are among the most common materials solutions to address the widespread problems associated with corrosion. See G. H. Koch et al., FHWA-RD-01-156, U.S. Department of Transportation, Federal Highway Administration, Washington D.C., 2002; and H. Jr. Leidheiser, *Corrosion* 38, 374 (1982). Typically, these coatings comprise a thick polymer layer or epoxy composite film that can add weight to a surface, change the appearance of a substrate, and can be difficult to apply uniformly, especially for complex surface shapes. See A. Talo et al., *Synth. Met.* 85, 1333 (1997); S. Qiu et al., *Surf. Topogr.: Metrol. Prop.* 6, 034007 (2018); and Y. Zhang et al., *ACS Nano* 12, 10189 (2018). Further, coatings that rely on vapor-phase depositions often require the use of expensive deposition chambers. See H. Yasuda et al., *Corros. Sci.* 52, 169 (1996).

Multilayered nanocomposite thin film coatings have been shown to provide anti-corrosion properties comparable to those exhibited by more traditional films that are orders of magnitude thicker. Simply adding inorganic clay platelets to a polymer and forming a polymer-clay nanocomposite coating has been shown to increase many physical properties without significantly increasing the cost. See Q. T. Nguyen and D. G. Baird, *Adv. Polym. Tech.* 25, 270 (2006). However, the random orientation of clay platelets in a typical composite provides little improvement of corrosion inhibition. See E. L. Cussler et al., *J. Memb. Sci.* 38, 161 (1988); and T. Ebina et al., *Adv. Mater.* 19, 2450 (2007). Alternatively, polymer-clay nanocomposite (PCN) thin films formed using a well-established Layer-by-Layer (LbL) deposition process of oriented layers of exfoliated clay platelets, interspersed with molecular layers of functional polymers, can provide highly organized composite coatings. See G. Decher, *Science* 277, 1232 (1997); S. Zhao et al., *ACS Nano* 13, 6151 (2019); G. Decher and J. B. Schlenoff, *Multilayer Thin Films: Sequential Assembly of Nanocomposite Materials*, second ed., Wiley-VCH Verlag & Co. KGaA: Weinheim, Germany (2012); J. J. Richardson et al., *Chem. Rev.* 116, 14828 (2016); J. J. Richardson et al., *Science* 348, aaa2491 (2015); G. S. Ferguson and E. R. Kleinfeld, *Adv. Mater.* 7, 414 (1995); and Z. Tang et al., *Nat. Mater.* 2, 413 (2003). These highly organized composites contain a high fraction (>80-90 weight %) of inorganic platelets that cannot be generated using traditional random mixing properties (~3-5 weight % clay). See T. Guin et al., *Langmuir* 30, 7057 (2014); and Q. T. Nguyen and D. G. Baird, *Adv. Polym. Tech.* 25, 270 (2006). The high inorganic content and rigorous organization of the layered composite structure provide unique composite properties. See K. M. Holder et al., *J. Mater. Sci.* 52, 12923 (2017); D. A. Hagen et al., *ACS Appl. Mater. Interfaces* 6, 22914 (2014); and D. A. Hagen et al., *RSC Adv.* 4, 18354 (2014). Further, the self-assembled PCN films can be coated on a variety of surfaces, including complex shapes, and can provide corrosion protection in films only 100-400 nm thick. See E. J. Schindelholz et al., *ACS Appl. Mater. Interfaces* 10, 21799 (2018); S. Qin et al., *ACS Appl. Nano Mater.* 1, 5516 (2018); and U.S. Pat. No. 10,150,873 to Schindelholz et al., issued Oct. 18, 2018.

The field of self-assembled polymer nanocomposites is broad with many different composites incorporating radically different materials into the composites, including graphene, MXenes, nanoparticles and functional organic molecules/enzymes, all with a wide variety of applications. See S. Zhao et al., *ACS Nano* 13, 6151 (2019); J. J. Richardson et al., *Chem. Rev.* 116, 14828 (2016); Y. Wang et al., *ACS Appl. Mater. Interfaces* 8, 24962 (2016); K. Hu et al., *Prog. Polym. Sci.* 39, 1934 (2014); K. Hu et al., *Adv. Mater.* 25, 2301 (2013); M. Boota et al., *Chem. Mater.* 29, 2731 (2017); M. Boota et al., *Adv. Mater.* 28, 1517 (2016); J. Y. Kim et al., *Chem. Mater.* 22, 6409 (2010); J. Dai and M. L. Bruening, *Nano Lett.* 2, 497 (2002); S. Bhattacharjee and M. L. Bruening, *Langmuir* 24, 2916 (2008); D. Yoo et al., *Synth. Met.* 85, 1425 (1997); G. Decher et al., *Curr. Opin. Colloid Interface Sci.* 3, 32 (1998); and V. H. Orozco et al., *Polymer* 51, 4127 (2010). LbL-grown PCN films, however, have also been shown to be versatile materials, primarily because their combination of ordered structure and tailored chemistry has enabled a wide variety of applied materials including gas barriers and fire retardants. See T. Guin et al., *Langmuir* 30, 7057 (2014); D. A. Hagen et al., *ACS Appl. Mater. Interfaces* 6, 22914 (2014); D. A. Hagen et al., *RSC Adv.* 4, 18354 (2014); G. Decher, *Science* 277, 1232 (1997); and D. Zhang et al., *J. Colloid. Interface Sci.* 505, 892 (2017). Recently, similar PCN films have been shown to be extremely effective gas phase corrosion barriers to gaseous $H_{2S}$ on copper substrates. See E. J. Schindelholz et al., *ACS Appl. Mater. Interfaces* 10, 21799 (2018). Another recent report described the use of PCN coatings inhibiting the corrosion of aluminum. See S. Qin et al., *ACS Appl. Nano Mater.* 1, 5516 (2018). Still, few studies have examined the corrosion barrier properties of PCN films and even fewer have looked at the corrosion barrier properties of these films under immersion in corrosive saline environments. See Y. Zhang et al., *ACS Nano* 12, 10189 (2018); S. Qin et al., *ACS Appl. Nano Mater.* 1, 5516 (2018); and E. Faure et al., *Langmuir* 28, 2971 (2012). Some anticorrosion studies of composite films comprising LbL-deposited polyelectrolyte and nanocontainers have shown interesting corrosion prevention properties. See D. V. Andreeva et al., *J. Mater. Chem.* 18, 1738 (2008); T. R. Farhat and J. B. Schlenoff, *Electrochem. Solid State Left.* 5, B13 (2002); J. Dai et al., *Ind. Eng. Chem. Res.* 39, 3528 (2000); F. Fan et al., *ACS Appl. Mater. Interfaces* 7, 27271 (2015); D. V. Andreeva et al., *Adv. Mater.* 20, 2789 (2008); D. G. Shchukin et al., *J. Phys. Chem. C* 112, 958 (2008); D. G. Shchukin and H. Möhwald, *Small* 3, 926 (2007); and D. G. Shchukin et al., *Adv. Mater.*

18, 1672 (2006). However, these composite coatings were composed entirely of polymers and did not incorporate the clay platelets.

SUMMARY OF THE INVENTION

The present invention is directed to a method for depositing a nanocomposite anticorrosion coating on a corrodible metal, comprising depositing at least one bilayer on a surface of the corrodible metal, the bilayer comprising a layer of a cross-linkable polymer and a layer of dispersed and aligned inorganic platelets, and subsequently cross-linking the cross-linkable polymer. The cross-linkable polymer can be an externally cross-linkable polymer wherein the cross-linking comprises diffusing a cross-linking agent into the deposited at least one bilayer. For example, the externally cross-linkable polymer can comprise a cationic polymer, such as polyethyleneimine or ethylene vinyl amine, which can be cross-linked with glutaraldehyde. Alternately, the cross-linkable polymer can be a functionalized cross-linkable polymer wherein the cross-linking comprises self-curing, thermal heat curing, or light (e.g., UV) curing of the functionalized cross-linkable polymer. For example, the functionalized cross-linkable polymer can comprise a polymeric amine that is partially reacted with an epoxy resin and then further cured after film deposition. The functionalized cross-linkable polymer can comprise a methacrylate, thiol, disulfide, azide, diazonium, alkene, alkyne, furan, maleimide, isocyanate, acrylate, carboxylic acid, halide, epoxide, cyanate ester, amine, anhydride, or enone functionalization that can be intrinsically cross-linked after film deposition.

As examples of the invention, the immersion corrosion resistance of cross-linked polymer-clay nanocomposite (PCN) barrier thin films coated on low carbon steel was investigated. The coatings were deposited using a Layer-by-Layer (LbL) self-assembly process and were only a few hundred nanometers thick. The coatings were cross-linked after film deposition. The cross-linked PCN coatings exhibited excellent corrosion barrier properties, comparable to conventional coatings that are orders of magnitude thicker.

BRIEF DESCRIPTION OF THE DRAWINGS

The detailed description will refer to the following drawings, wherein like elements are referred to by like numbers.

FIG. 2A shows the FTIR spectra of cross-linked bulk polyethyleneimine (PEI) polymer. FIG. 2B shows the FTIR spectra of a cross-linked PCN film with 40 BLs. The short-dashed line denotes the primary amine N—H stretch ( . . . ) and the long-dashed line denotes the C═N stretch (- - -).

As shown in FIGS. 4A and 4B, a large area has corroded on the bare steel sample and the 40 BL non-cross-linked sample after 24 hours. As shown in FIG. 4C, the glutaraldehyde cross-linked sample shows almost no signs of corrosion of the steel surface.

DETAILED DESCRIPTION OF THE INVENTION

Figure 1:
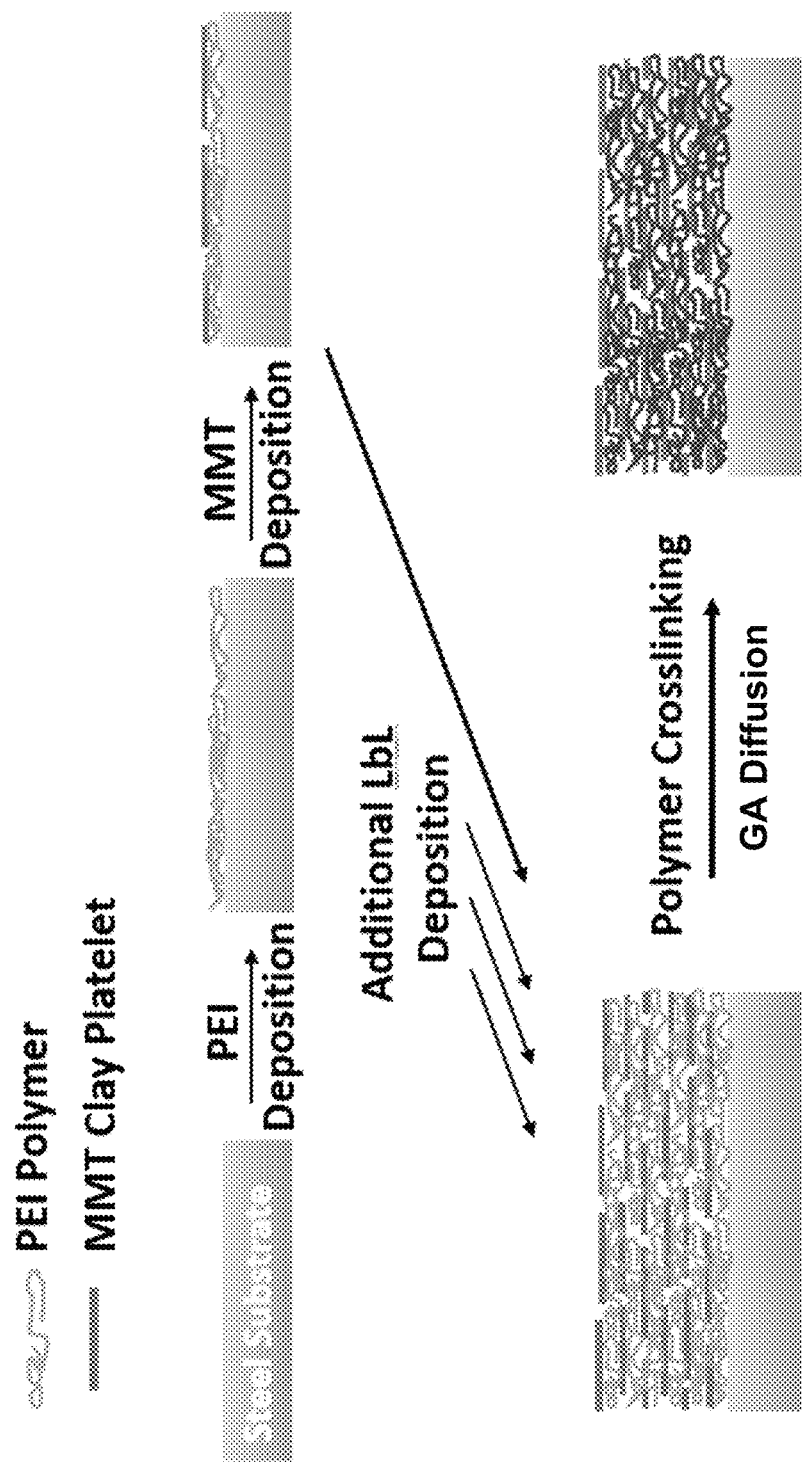
FIG. 1 is a schematic illustration showing the deposition of sequential polymer and clay layers forming a bilayer (BL) with additional BLs deposited to build up the polymer-clay nanocomposite (PCN) film on the steel substrate, followed by cross-linking of the polymer matrix with a cross-linking agent.

Highly organized nanocomposite thin films comprising a polymer matrix and 2D materials, such as exfoliated clay platelets, exhibit excellent barrier properties that make them attractive as anticorrosion coatings. See U.S. Pat. No. 10,150,873 to Schindelholz et al., issued Oct. 18, 2018, which is incorporated herein by reference. In immersion-based corrosion applications, however, forming bonded networks throughout the polymer matrix can increase the mechanical integrity and barrier properties of the coatings. The present invention is based on nanocomposite coatings comprising multiple layers of platelet particles (i.e., a two-dimensional or lamella-type material), dispersed and oriented within a cross-linked polymer matrix. The platelet composition, degree of platelet exfoliation, and platelet aspect ratio can be optimized to affect barrier properties. The oriented layers of platelets form a tortuous diffusion pathway for corrosive species. In general, the platelets can comprise exfoliated clay platelets (e.g., montmorillonite (MMT), vermiculite (VMT), laponite, kaolinite, mullite, mica, or other clay-based materials) or other large aspect ratio inorganic platelet materials (e.g., alumina, MXenes, $TiO_2$ nanosheets, graphene, graphene oxide, boron nitride, or layered double hydroxides, etc.). For example, the coating can be represented as a PCN-ordered thin film structure comprising alternating layers of highly aligned clay platelets (each ~1 nm thick) and cross-linkable polymers, deposited on a normally corrodible metal substrate. For example, the polymer can be a commercially-available polyethyleneimine (PEI), which is strongly cationic. Other cationic polymer systems, such as the cationic equivalent to EVA, ethylene vinyl amine (a copolymer of ethylene and vinyl amine), can also be used. See J. Leonard et al., *Macromolecules* 45, 671 (2012). These polymers can be cross-linked by diffusing a cross-linking agent, such as glutaraldehyde, into the previously deposited layered nanocomposite coating. Other cross-linking agents can be used, including isothiocyanate, isocyanate, N-hydroxysuccinimide ester, acyl azide, sulfonyl chloride, aldehyde, epoxide, oxirane, carbonate, aryl halide, imido ester, carbodiimide, or anhydride. However, cross-linking agents can be expensive and can be inefficiently incorporated into the deposited film. Therefore, the method can alternatively use intrinsically cross-linkable functionalized polymers which can be cross-linked by self-curing, thermal curing, or UV-curing after film deposition, thereby eliminating a possibly expensive processing step. For example, the functionalized polymer can comprise a polymeric amine that is partially reacted with an epoxy resin or other polymer that leaves a functionalized cross-linkable polymer that can be further cured after film deposition. The functionalized cross-linkable polymer can comprise other functional groups, including thiol, disulfide, azide, diazonium, alkene, alkyne, furan, maleimide, isocyanate, acrylate, carboxylic acid, halide, epoxide, cyanate ester, amine, anhydride, enone, etc. Alternatively, the cross-linkable polymer can comprise a mixture of a polymeric curative, or curing agent, and a polymeric resin. The polymeric curative can comprise a plurality of amine, thiol, alcohol, azide, anhydride, alkene, or carboxylic acid functional groups. The polymeric resin can comprise a plurality of epoxy, bismaleimide, isocyanate, alkyne, alkene, acrylate, anhydride, carboxylic acid, cyanate ester, or halide functional groups.

The invention is highly versatile and can be used to protect a wide variety corrodible metals, including various steels, copper, brass, bronze, copper, iron, zinc, aluminum, magnesium, silver, nickel, and alloys thereof. The thin film structure can be assembled through the LbL deposition of alternating molecular layers of cross-linkable polymer and inorganic platelets. The LbL deposition can comprise sequential spraying, dipping or other coating methods using solutions containing the components discussed above. The LbL deposition parameters (coating time, reagent compositions and concentrations, order and sequence of coating, pH etc.) can be tuned to create tailor-made nanocomposite coatings with variable thicknesses and resulting properties. Other deposition processes can be used, including spray coating, tape casting, reel-to-reel, flexographic, gravure, and doctor-blading. Additionally, more constituents can be included in the coatings by simply adding additional dip steps into solutions containing different chemical species to create more complex nanocomposite films, such as tri-layers and quad-layers. The relative impermeability of the cross-linked nanocomposite coatings to corrosive species—imparted by the highly-organized platelet layers and the cross-linked polymer matrix—can provide favorable corrosion protection over conventional coatings.

Nanocomposite Coating with Externally Cross-linkable Polymer

As an example of the invention, the corrosion inhibiting properties of PCN coatings applied to a 1018 low-carbon steel and immersed in an aqueous saline environment, comparable to sea water, are described below. The inherent mechanisms of steel corrosion in saltwater have been previously and extensively investigated. See J. Alcáantara et al., *Materials* 10, 406 (2017); and T. Nishimura et al., *Corrosion* 56, 935 (2000). Although many different cross-linkable polymers and inorganic platelets can be used, the example below uses a branched chain polyethyleneimine (PEI) in conjunction with montmorillonite (MMT) clay platelets. The LbL deposition enables the controlled variation of film thickness and evaluation of corrosion inhibition as a function of the number of layers of nanocomposite coating on the steel surface. Moreover, the highly aminated character of the PEI polymer component of the composite enables evaluation of the influence of covalent chemical cross-linking in the films on the corrosion-inhibiting properties of the PCN coatings.

Steel substrates were pre-treated in a solution of sodium nitrate and sodium hydroxide to form a uniform oxide passivation layer on the steel prior to aqueous LbL deposition of the PCN coatings. Without this passivation layer, defects can form on the steel substrates during PCN growth that ultimately degrade the corrosion inhibiting properties of the barrier film. This composition of the solution to form the passivation layer is not meant to be exclusive, for example any alkaline solution with a chemical oxidant could be used. All control "bare" steel samples were similarly treated to create this oxide passivation layer.

The process for PCN deposition and subsequent cross-linking via a cross-linking agent on a passivated steel substrate is illustrated in FIG. 1. Films can be grown using an automated robotic dip-coater that first dips substrates in an aqueous solution of cationic PEI, followed by a water rinse and drying under forced nitrogen, leading to the formation of a thin layer of PEI on the substrate surface. Subsequent dipping in an aqueous suspension of exfoliated MMT resulted in self-assembly of highly ordered clay platelets on the PEI layer, based on a combination of electrostatic and hydrogen bonding driving forces. See J. J. Richardson et al., *Chem. Rev.* 116, 14828 (2016). Rinsing and drying under nitrogen completed one bilayer (BL) of the composite film. This process was repeated until the desired number of BLs was deposited on each test sample. The multilayer film growth was consistent with previous reports and film thicknesses were determined to be approximately 50 nm for every 10 BLs, following a linear growth rate. See D. A. Hagen et al., *ACS Appl. Mater. Interfaces* 6, 22914 (2014); and M. A. Priolo et al., *Langmuir* 27, 12106 (2011).

Once the steel substrate was coated to the desired number of BLs, the sample was either used as is (i.e. is not cross-linked) or placed in a concentrated aqueous glutaraldehyde (GA) solution (25% GA) to cross-link the PEI matrix in the PCN film (below, sample labels with GA in the label denote cross-linking). The GA cross-links the films by reacting with the primary amines located on the PEI polymer chains.

Figure 2A:
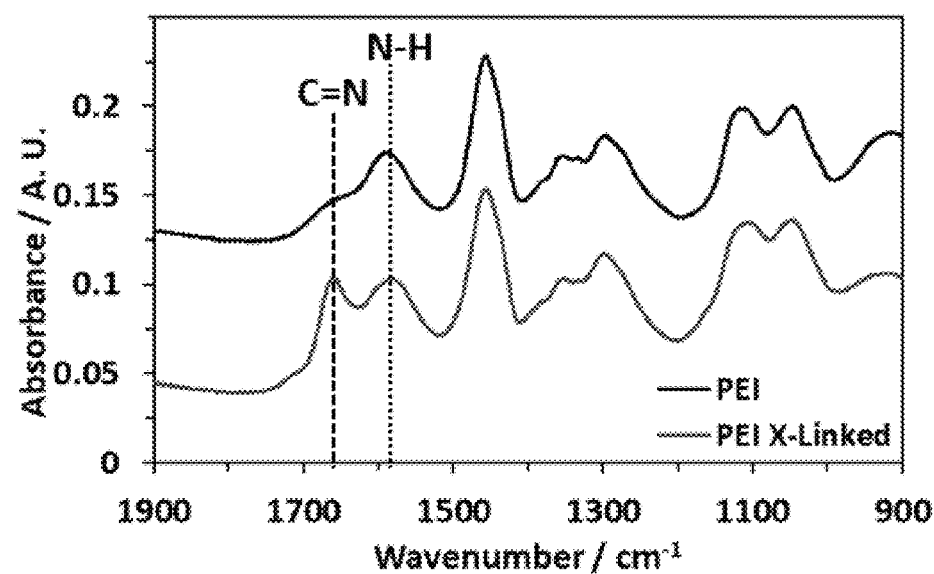
FIGS. 2A and 2B are FTIR spectra showing the infrared absorbance peaks before and after cross-linking with glutaraldehyde.
Figure 2B:
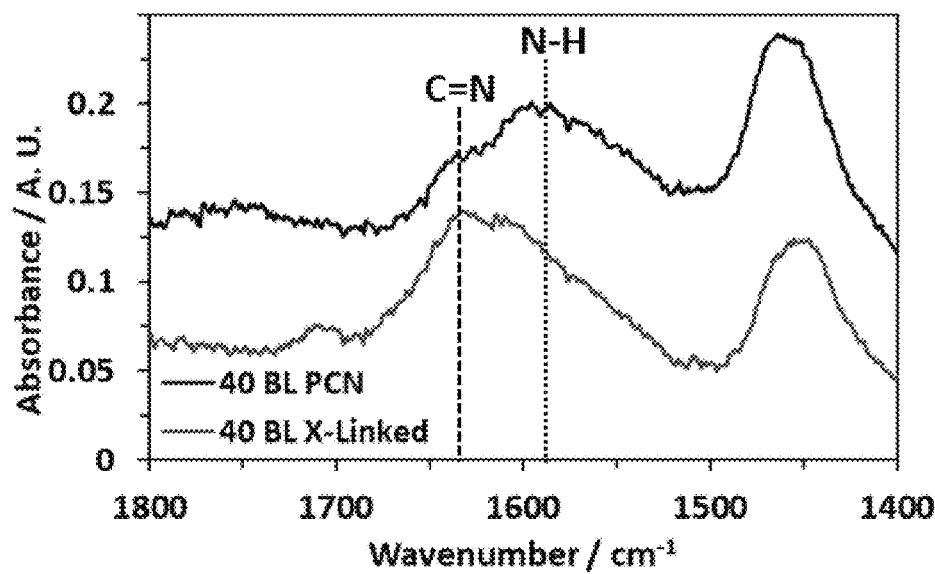

To verify the primary amines of the PEI were cross-linking, FTIR spectra were obtained on both a representative sample of branched PEI and the PCN films, as shown in FIGS. 2A and 2B, respectively. The representative PEI sample consisted of a large amount of PEI applied directly to a substrate and cross-linked for 12 hours in 25 wt. % GA solutions (under the same conditions as used for the PCN-coated steel samples). The FTIR spectrum region of interest from the cross-linked PEI (labeled "PEI X-Linked") is shown in comparison to a pristine PEI sample (labeled "PEI") in FIG. 2A. The spectra show a peak located at 1580 $cm^{-1}$ for both samples (denoted by a short-dashed line) which is attributed to the N—H stretch in a primary amine. There is a small shoulder at higher wavenumbers associated with this peak due to the secondary amines located in the PEI polymer. After cross-linking, the primary amine peak decreases slightly relative to the other peaks and a new strong peak grows at 1660 $cm^{-1}$, attributed to a C=N stretch (denoted by a long dashed line) which is from the newly formed bonds between the nitrogen from the primary amine and the carbon in the glutaraldehyde.

The FTIR results from the bulk PEI helped confirm that the cross-linking of the PEI layers in the PCN film occurred. Shown in FIG. 2B is the FTIR spectra from a 40 BL PCN film before (labeled "40 BL PCN") and after glutaraldehyde cross-linking (labeled "40 BL X-Linked"). Similar to the bulk PEI, the N—H stretch from the primary amine peak is observed but has shifted a little to 1590 $cm^{-1}$. This peak also has a small shoulder at higher wavenumbers, similar to the bulk PEI before cross-linking. After cross-linking, the primary amine peak is again observed to decrease, and a large increase is observed in the peak that is attributed to the C=N stretch. Again, this peak has shifted to lower wavenumbers and is now located at 1630 $cm^{-1}$. The shift of the peaks compared to the bulk PEI is probably related to the intimate interactions of the PEI and MMT within the PCN films.

To probe the corrosion-resistance of these PCN and cross-linked PCN films, coated samples and bare controls were exposed to 0.6 M aqueous NaCl for 24 hours in an electrochemical cell. One sample from the group with the cross-linked coating was exposed for 168 hours (7 days), a timescale common in similar published studies of coated steel corrosion. See Y. Zhang et al., *ACS Nano* 12, 10189 (2018). Throughout the exposure, electrochemical impedance spectroscopy (EIS) was used to monitor the corrosion resistance of the PCN coatings, in situ. See E. Barsoukov and J. R. Macdonald, *Impedance Spectroscopy: Theory, Experiment, and Applications*, second ed., John Wiley and Sons, Hoboken, N.J. (2005). EIS spectra were collected every hour throughout the duration of the exposure test, and open circuit potential (OCP) was tracked between EIS scans (for the 7-day tests, EIS scans were taken every hour for the first day and then every 6 hours for the remaining days). A high magnitude impedance indicates a good corrosion barrier. If the magnitude of the impedance drops over time, this can be an indication that the coating is degrading.

Figure 3A:
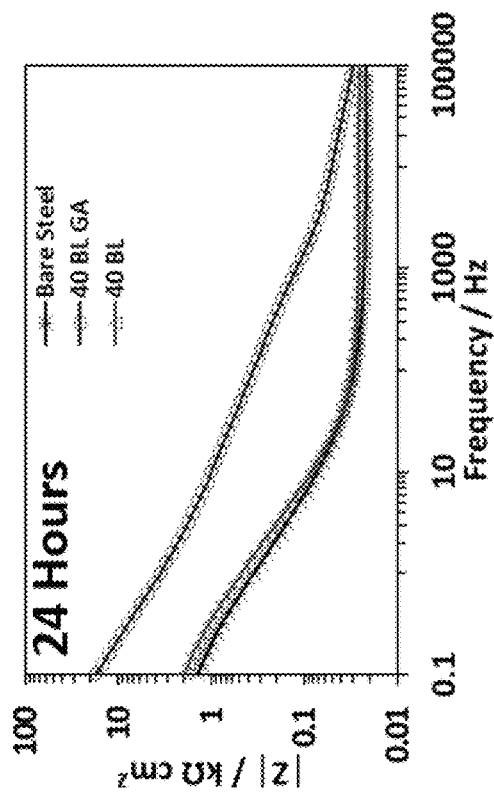
FIGS. 3A-3B are Bode impedance spectra showing the differences in impedance between a bare steel sample, an as coated 40 BL sample, and a 40 BL GA cross-linked sample in 0.6 M NaCl solution at the start of the test and after 24 hours, respectively.
Figure 3B:
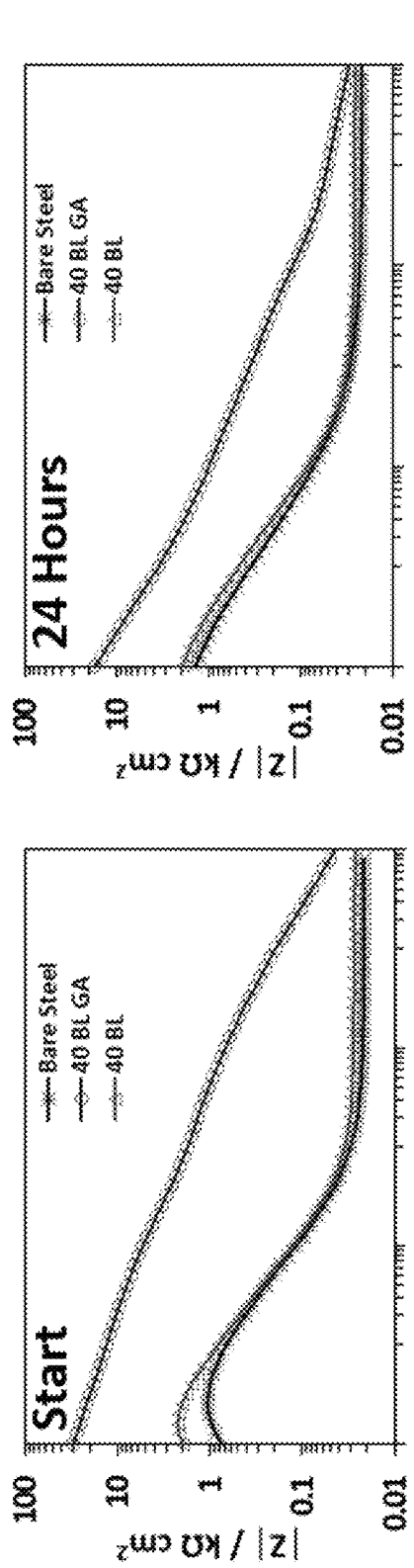
Figure 3C:
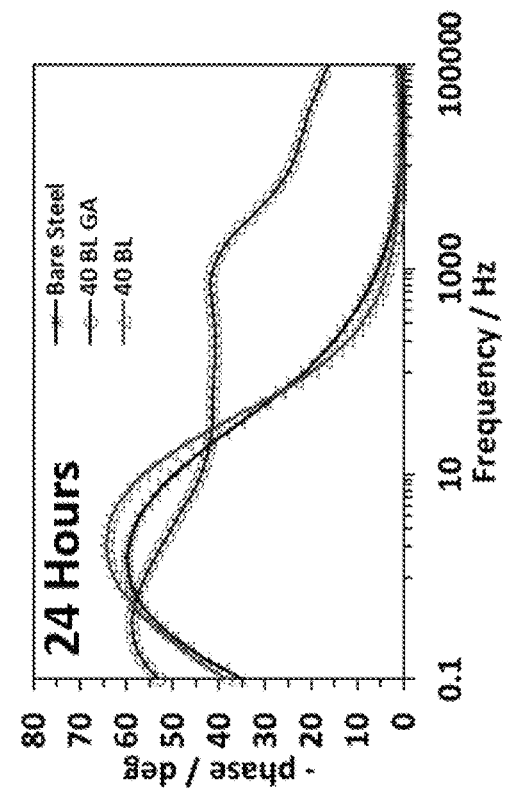
FIGS. 3C and 3D show Bode phase plots for the same samples at the start and end of the 24 hours corrosion test, respectively.
Figure 3D:
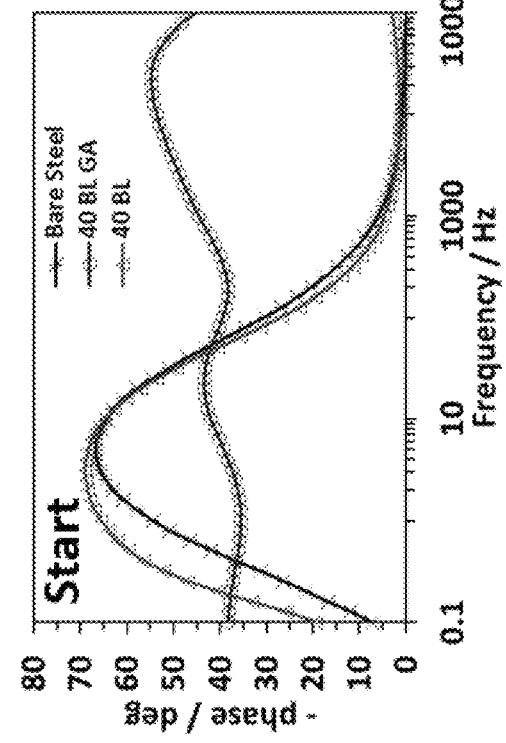

FIGS. 3A-3D show the Bode magnitude and Bode phase angle plots generated from the EIS measurements performed on three steel coupons: passivated bare (uncoated) steel control (labeled "Bare Steel"), an as-coated (not cross-linked) sample with 40 BL PCN (labeled "40 BL"), and a sample coated with 40 BL PCN after GA cross-linking (labeled "40 BL GA"). FIGS. 3A and 3B show the impedance magnitude (|Z|) versus frequency measured from these samples at the start and at the end of the 24-hour test, respectively. In an effective corrosion barrier, the low frequency impedance would start high and remain high over time. FIGS. 3C and 3D show the phase angle vs frequency plots for the same samples. In these plots, the high phase angle correlates to larger coating impedance than a low phase angle. Ideally, a good coating would display a high phase angle over all frequencies.

The data in FIG. 3A show that the non-cross-linked samples coated with 40 BL perform nearly identically to the bare steel samples; neither sample significantly resists corrosion, as evidenced by the low impedance at low frequencies (0.1 Hz). In contrast, the low frequency impedance of the cross-linked 40 BL GA sample is 15 times greater than that of the non-cross-linked sample (30.3 $k\Omega/cm^2$ for the cross-linked sample vs 2.0 $k\Omega/cm^2$ for the non-cross-linked sample). Clearly, GA cross-linking has a significant effect on the initial corrosion resistance of the of the PCN films with the same number of BLs. As shown in FIG. 3B, after 24-hours the bare and non-cross-linked samples continue to display similar EIS responses consistent with a corroding sample. In contrast, the cross-linked sample still shows considerably higher low frequency impedance than the 40 BL non-cross-linked sample. It should be noted, though, that despite this improvement, low frequency impedance of even the cross-linked sample after 24 hours has decreased by 42% to 17.5 $k\Omega/cm^2$.

The Bode phase plots in FIGS. 3C and 3D reveal a significantly increased phase angle for the cross-linked PCN coating at high frequencies compared to the other samples. The phase angle is increased dramatically at high frequencies due to the covalently cross-linked nature of the 40 BL GA coating. The cross-linked PCN coatings display a large phase angle at high frequencies, which also persists after 24 hours immersion, suggesting slow ingress of the saline solution through the coating and coating degradation. This high frequency contribution is likely due to the cross-linked PCN coating inhibiting the fast diffusion of ions in the coating thus slowing their transport through the film.

Figures 4A, 4B, 4C:
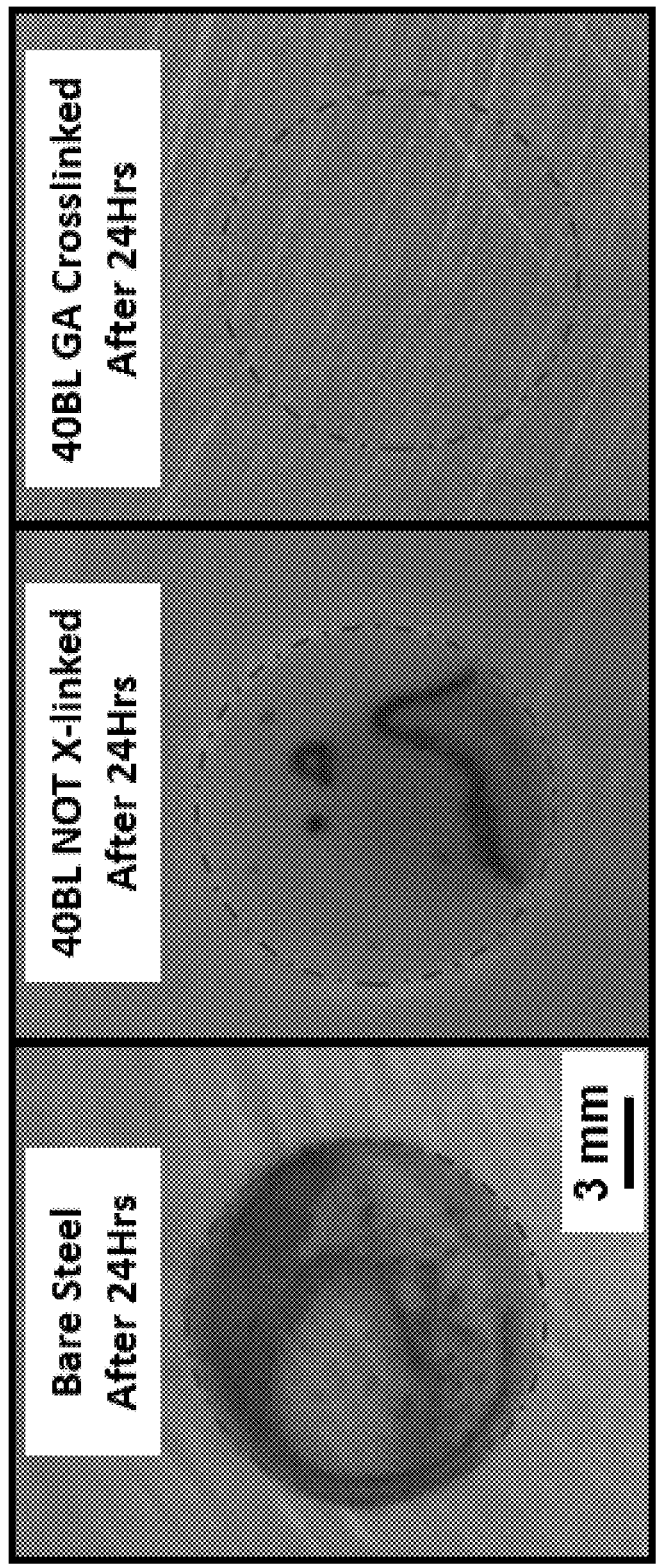
FIGS. 4A-4C are optical images of bare and steel samples coated with PCN bilayers after the 24-hour corrosion test. The dot-dashed circle denotes the test area. Scale bar is the same for all pictures.

The resistance to corrosion from the three different samples is visually apparent in the optical images displayed in FIGS. 4A-4C. Images were taken after the 24-hour immersion experiments and the area of saline exposure is highlighted by the dotted rings in each image. The dark and orange colored corrosion products visible across much of the exposed test area on the bare steel and 40 BL samples in FIGS. 4A and 4B indicate significant corrosion, consistent with the EIS data. In contrast, the image of the cross-linked 40 BL GA sample in FIG. 4C shows no obvious macroscopic signs of corrosion and looks almost as if it had not been exposed to the saltwater, verifying the apparent corrosion inhibiting capacity of the cross-linked PCN films indicated in the impedance data. This also suggests the changes to the impedance with time are largely caused by the ingress of the salt solution. The slowed corrosion in the cross-linked films is likely related to the slowed rate of diffusion of ions (such as chloride) and oxygen to the surface of the steel substrate, which accelerate iron corrosion. See A. M. Lehaf et al., *Langmuir* 27, 4756 (2011); J. J. Harris et al., *J. Am. Chem. Soc.* 121, 1978 (1999); and Y.-H. Yang et al., *RSC Adv.* 2, 12355 (2012).

Figure 5A:
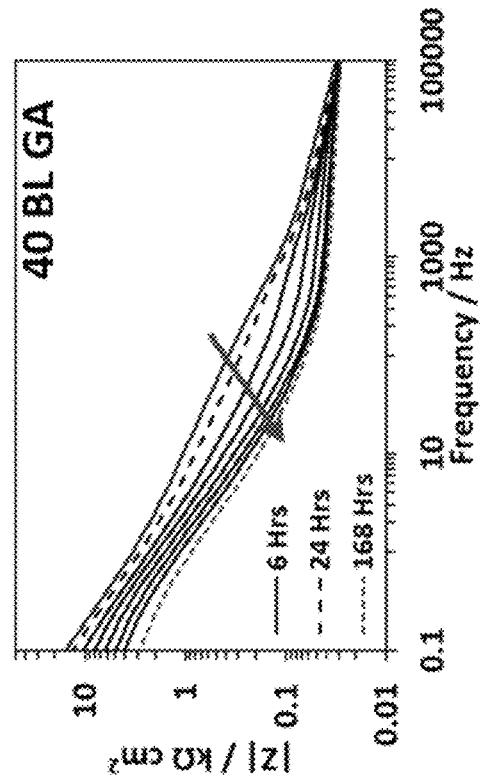
FIGS. 5A-5C are Bode impedance plots from samples with increasing numbers of cross-linked PCN BLs: 20 BL GA (FIG. 5A), 40 BL GA (FIG. 5B), and 60 BL GA (FIG. 5C). All samples were tested over the course of 168 hours. Arrows denote the progression of the sample data from 24 to 168 hours (1 to 7 days) with each spectrum representing an additional 24 hours of corrosion time.
Figure 5B:
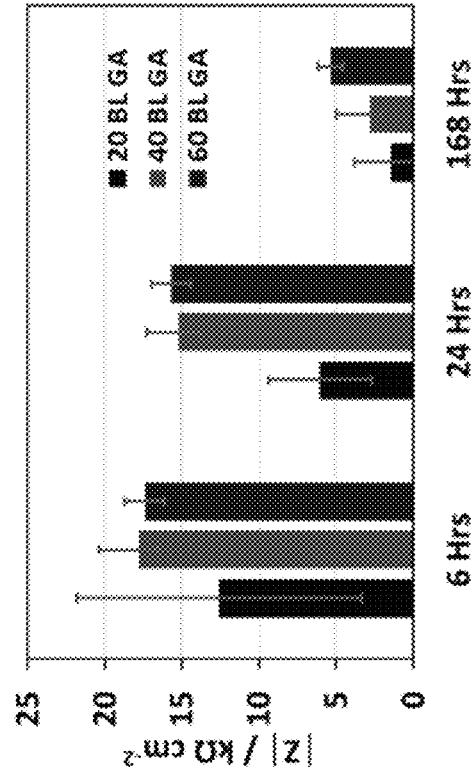
Figure 5C:
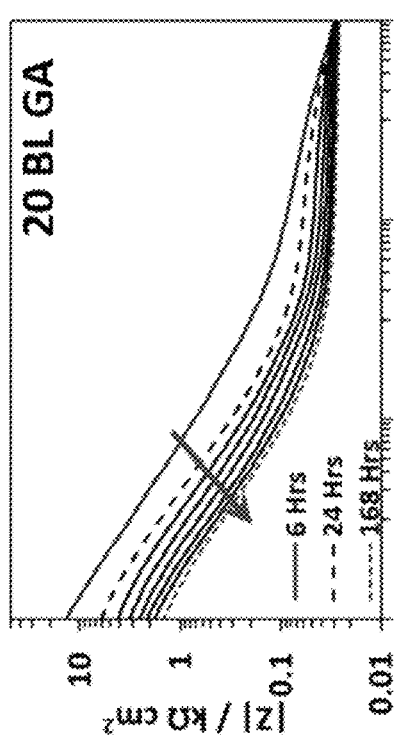
Figure 5D:
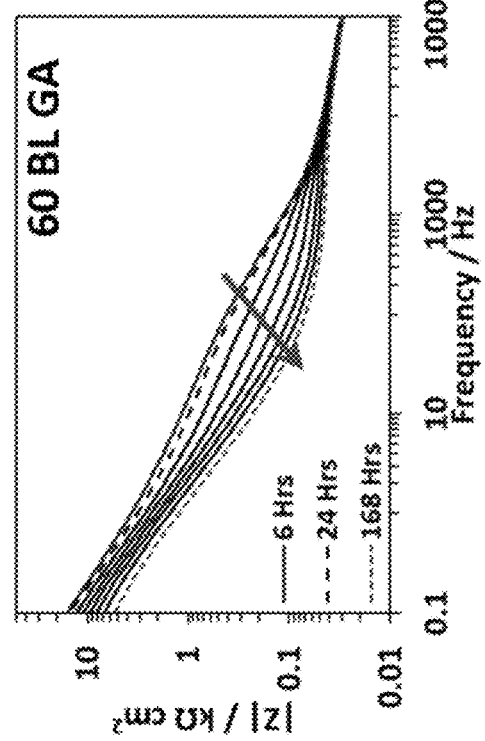
FIG. 5D is a bar graph showing the low frequency (at 0.1 Hz) impedance value for each thickness over time.

Although PCN cross-linking appears to significantly impact the corrosion resistance, the thickness of the PCN barrier film also affects the corrosion rate. Bode magnitude plots are shown in FIGS. 5A-5C for 20, 40, and 60 PCN BLs (all GA cross-linked). Each plot shows the evolution of the data over the course of 168 hours immersion. The Bode impedance magnitude plots in FIGS. 5A-5C show that for all number of BLs at 6 hours, the low frequency value is similar (~30 k$\Omega$/cm$^2$). Over time, however, the 20 BL GA film sees the largest reduction in low frequency impedance magnitude, dropping substantially in the first 24 hours, ultimately exhibiting similar magnitude impedance to the bare steel or the non-cross-linked sample seen in FIG. 3B. The 40 BL GA and 60 BL GA samples, however, degrade at a slower rate than the 20 BL GA sample and their low frequency impedance magnitude does not drop to that of bare steel by the end of the 168-hour test. The bar graph presented in FIG. 5D summarizes the change in low frequency impedance over time for the different thickness PCN coatings. The 60 BL GA sample displays the largest low frequency impedance at the end of the test, 5.4 k$\Omega$/cm$^2$ for the 60 BL GA vs 2.8 k$\Omega$/cm$^2$ for the 40 BL GA. The apparent dependence of the corrosion inhibition on the number of BLs suggests that the increase in the number of layers may have impacted the diffusion of electrolyte through the films and increased the charge transfer resistance ($R_{ct}$) in these coatings.

Figure 6:
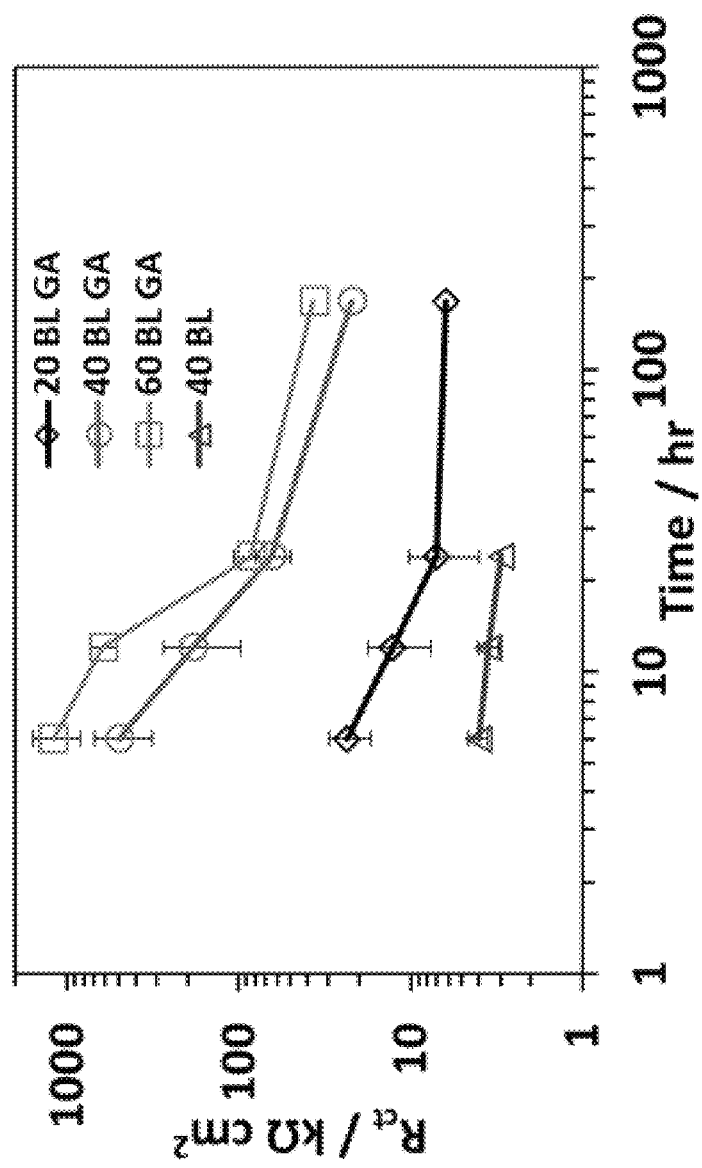
FIG. 6 shows the calculated charge transfer resistance, $R_{ct}$, over time for 20, 40, 60 BLs. Time points chosen for the analysis were 6 hours, 12 hours, 24 hours and 168 hours (7 days). Error bars represent one standard deviation and there are no error bars for the data points at 168 hours.

The charge transfer resistance ($R_{ct}$) is recognized as a one of the more important barrier properties correlated with corrosion resistance, since it is related to the electrochemical reactions on the metal surface. See E. Barsoukov and J. R. Macdonald, *Impedance Spectroscopy: Theory, Experiment, and Applications*, second ed., John Wiley and Sons, Hoboken, N.J. (2005); and D. D. McDonald, *ECS Trans.* 19, 55 (2009). These PCN coatings were modeled with an equivalent circuit to extract the $R_{ct}$. See S. J. Percival et al., *Surf. Coat. Technol.* 383, 125228 (2020); and M. A Melia et al., *Prog. Org. Coat.* 140, 105489 (2020). FIG. 6 shows the variation in $R_{ct}$ as a function of PCN film composition and exposure time from 6 hours to 168 hours. The $R_{ct}$ for all sample conditions were taken from the values determined by a low frequency fitting procedure for the model. First, based on the data shown above, the $R_{ct}$ is significantly higher at all times when the films are cross-linked (40 BL GA is ~125 times larger than the 40 BL non-cross-linked sample at 6 hours (5.05×10$^5$ $\Omega$-cm$^2$ vs 4.03×10$^3$ $\Omega$-cm$^2$)). By the end of 24 hours the $R_{ct}$ of the 40 BL GA coating is still ~21 times higher than in the non-cross-linked sample. (6.42×10$^4$ $\Omega$-cm$^2$ vs 3.0×10$^3$ $\Omega$-cm$^2$).

Looking at cross-linked films of different BL numbers, the $R_{ct}$ increases with increasing BL number where 60 BL GA shows the highest $R_{ct}$ at all time intervals during the 24-hour test and even at the end of the 168-hour test. At 6 hours, the 60 BL GA sample exhibited $R_{ct}$ of 1.21×10$^6$ $\Omega$-cm$^2$, which is ~300 times greater than the ineffective non-cross-linked 40 BL film at the same time point. These results are consistent with the previous observations that the thicker, cross-linked PCN films provided the best corrosion protection. In all cases, however, $R_{ct}$ decreases over time, suggesting that either the film has degraded over time or that conductive (corrosive) electrolyte has permeated the multi-layered barrier films over time. As an example of how the coating has changed, Nyquist plots of the modeled coating impedance (isolated from the substrate impedance) for a 60 BL GA cross-linked coating with respect to immersion time showed that the impedance of the coating by itself decreases over time.

The highly resistive nature of these coatings along with the large magnitude of the calculated $R_{ct}$ (plotted in FIG. 6) show these PCN coatings are comparable to other corrosion barrier composites also coated on steel tested under similar conditions. See Y. Zhang et al., *ACS Nano* 12, 10189 (2018); S. Liu et al., *J. Mater. Sci. Technol.* 32, 425 (2016); and X. Shi et al., *Surf. Coat. Technol.* 204, 237 (2009). These other composite coatings involve coating the steel substrate with an epoxy composite deposited in alternating layers with graphene oxide or by making a slurry of the epoxy with the secondary constituent, either graphene, nanoparticles, or nanoclay. See Y. Zhang et al., *ACS Nano* 12, 10189 (2018); S. Liu et al., *J. Mater. Sci. Technol.* 32, 425 (2016); and X. Shi et al., *Surf. Coat. Technol.* 204, 237 (2009). The alternating layered graphene oxide/epoxy coating was 17 µm thick and showed calculated charge transfer resistances of 2.87×10$^6$ $\Omega$-cm$^2$ on the first day and dropped to 7.27×10$^5$ $\Omega$-cm$^2$ after 7 days of immersion in 3.5 wt % NaCl. See Y. Zhang et al., *ACS Nano* 12, 10189 (2018). The 50 µm thick graphene/epoxy slurry coated steel calculated charge transfer resistance was 1.81×10$^5$ $\Omega$-cm$^2$ after 2 days of immersion in 3.5 wt % NaCl solution. See S. Liu et al., *J. Mater. Sci. Technol.* 32, 425 (2016). Finally, ~40 µm thick composite coatings from a mixed slurry of epoxy and either nanoparticles or nanoclay showed calculated charge transfer resistances of 3.11×10$^6$ $\Omega$-cm$^2$ or 9.03×10$^5$ $\Omega$-cm$^2$, respectively, after 7 days of immersion in 3.0 wt % NaCl solutions. See X. Shi et al., *Surf. Coat. Technol.* 204, 237 (2009). The self-assembled PCN films of the present invention displayed calculated $R_{ct}$ values that are on par with those other, much thicker coatings. However, the PCN coatings of the present invention are orders of magnitude thinner, largely optically transparent and less expensive to make. The materials used to make these PCN coatings are also more readily available, where the clay used in these films can be mined from surface clay deposits and exfoliated in water and the cationic polymer is manufactured in large quantities. Additionally, these materials eliminate the required and extensive processing of materials using harsh chemicals, such as the production of graphene/graphene oxide which is commonly used in newly emerging advanced composite coatings.

Nanocomposite Coating with Inherently Cross-Linkable Functionalized Polymer

The invention is further directed to corrosion barrier composite films that utilize functionalized polymers capable of undergoing self-curing, thermal curing, or light (e.g. UV) curing to create robust, bonded matrix networks for improved barrier effectiveness and both chemical and mechanical stability. As an example, a simple, inexpensive method for assembling thin, nanostructured, corrosion barrier films onto structurally or functionally important steel supports is described below, although this method can also be applied to other corrodible metals. To ensure complete cross-linking of the coating intentionally designed and functionalized polymers can be used in place of the traditional cationic or hydrogen bonding polymers (e.g., PEI or polyvinylpyrrolidone). The functionalization can impart an inherent cross-linkable nature to the polymers which can be activated once the polymer is incorporated into the coating. These polymers can be either synthesized with specific molecular weights and functional groups tailored to the desired curing and film properties or, alternatively, commercially available polymers synthetically functionalized to impart the desired curing and resulting film properties.

Figure 7:
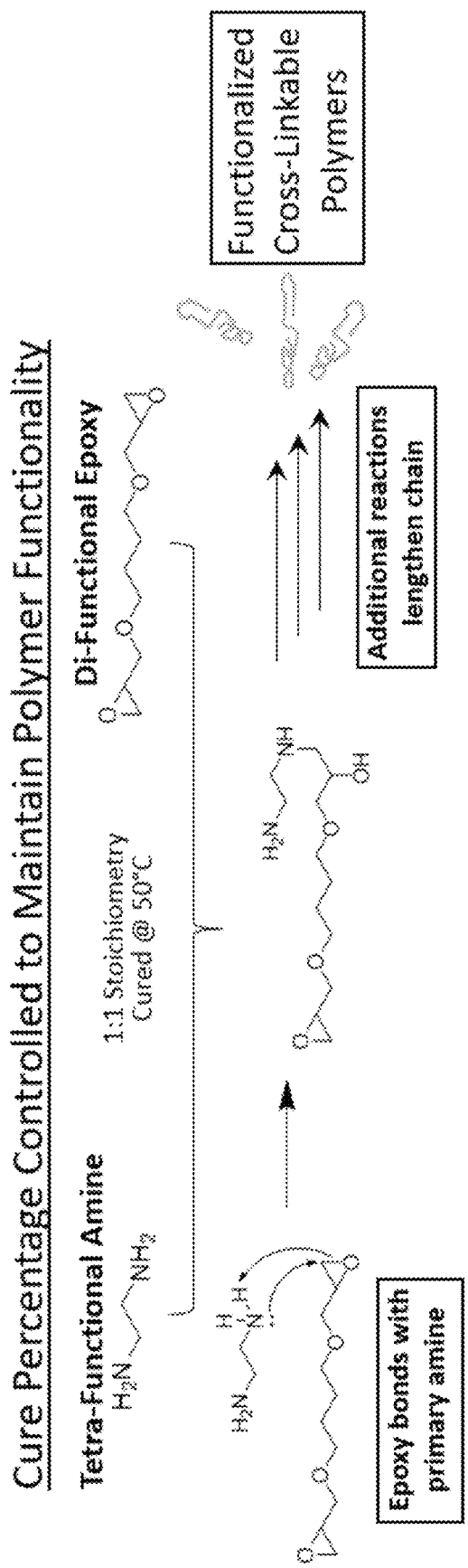
FIG. 7 shows an example of a functionalized cross-linkable polymer containing amines and epoxy groups whereby the degree of curing is precisely controlled such that the polymer can be additionally cured via a thermal heat treatment after film deposition.
Figure 8:
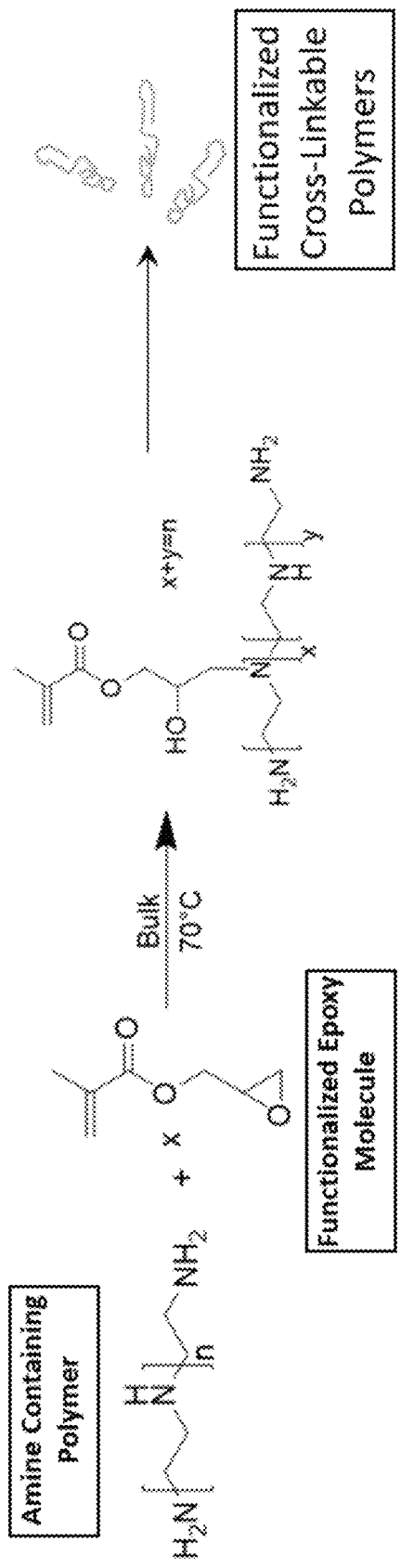
FIG. 8 shows an example of a functionalized cross-linkable polymer wherein the degree of functionality is controlled through stoichiometric ratios and the functional group (methacrylate) is attached to the amine-containing polymer through the reaction of an amine with the epoxy group attached to the methacrylate.

As examples, FIGS. 7 and 8 show two alternative routes for making functionalized polymers using polymeric amines. FIG. 7 shows a full synthetic route where ethylenediamine (EDA) and 1,4-Butanediol diglycidyl ether (DGEBD) are allowed to partially react through an epoxy group on the DGEBD and a primary amine on the EDA. The reaction can be stopped at a specified conversion state to control the molecular weight of the polymer chains and provide a functionalized cross-linkable polymer that can be self- or heat-cured after coating through further reaction of the epoxy and the amine groups. Further, any amine functional curative can be used with any epoxy functional resin so long as the resulting polymer is soluble in the coating solvent. FIG. 8 shows an alternative pathway whereby a polyamine is functionalized with an amine-reactive group. In this example, commercially available PEI and glycidyl methacrylate are allowed to fully react via epoxy/amine addition. This provides a functionalized cross-linkable polymer comprising a functional methacrylate group bound to the PEI. After coating, the polymer can be cross-linked via thermally driven amine/methacrylate addition. The amine functional polymer can be another polymer besides PEI given that the polymer contains reactive amine functional groups and is soluble in the coating solvent. Finally, either of the inherently cross-linkable polymers can be cured by UV irradiation where applicable. Other cross-linkable polymers that can be used include polymers with thiol, disulfide, azide, diazonium, alkene, alkyne, furan, maleimide, isocyanate, acrylate, carboxylic acid, or halide functionalizations.

Figure 9:
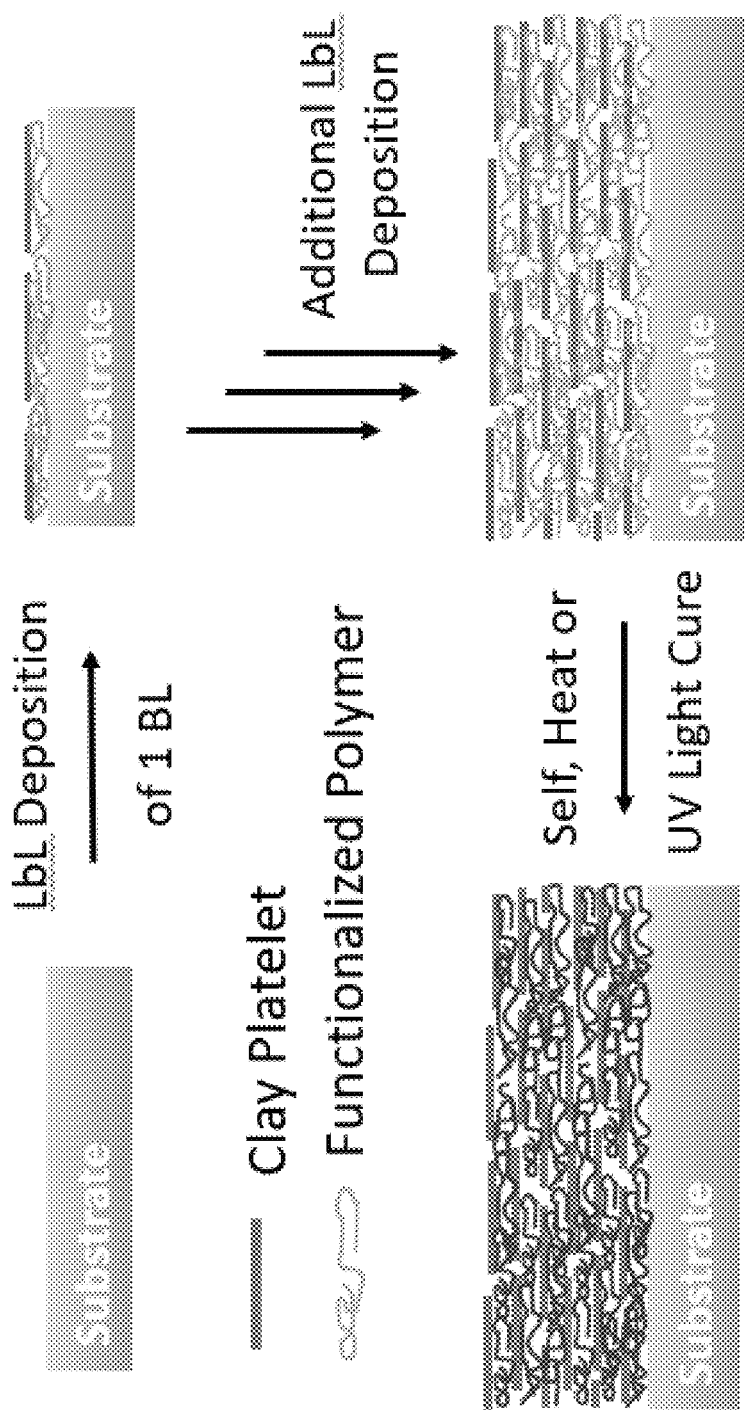
FIG. 9 is a schematic illustration of a Layer-by-Layer (LbL) deposition of a thin nanostructured polymer-clay nanocomposite onto a metal surface followed by cross-linking of a functionalized cross-linkable polymer by a self-curing or heat- or UV-light-curing process.

The LbL deposition of a thin nanostructured polymer-clay nanocomposite onto a metal surface followed by cross-linking of a functionalized polymer by a self-, or heat- or light-curing process is shown in FIG. 9. First, the substrate is dipped in an aqueous solution of the functionalized polymer, rinsed, then dipped in a solution containing the clay platelets, forming one "bilayer" (BL). The outermost polymer or clay layer being applied self-assembles first onto the substrate and then onto the alternating layers of polymer and clay through attractive molecular interactions such as electrostatic or hydrogen bonding interactions. The self-assembled and well-defined nanocomposite structure is largely responsible for the corrosion inhibition despite being thinner than conventional barriers. Due to the self-assembled nature of this LbL process, the deposited nanostructured PCN films can be quite thin (~500 nm for 100 BLs).

Figures 10A, 10B:
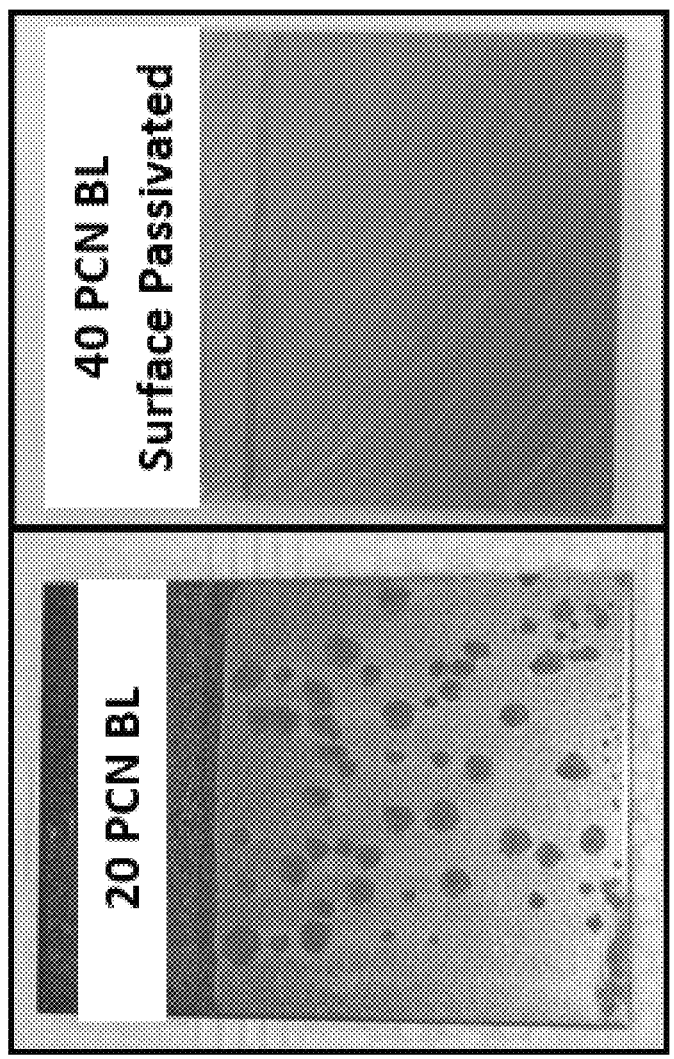
FIG. 10A is an optical image of a steel sample coated with PCN bilayers where large defects are observed in the films that eventually rust as the dip coating proceeds.
FIG. 10B is an optical image of a surface passivated steel sample that does not show the same defects and rusting behavior observed for un-passivated samples.

Before the LbL assembly of the PCN film on steel, a surface passivation process can be used to protect the low-carbon steel from unintended corrosion during the deposition of the coating. This passivation process may not be required with other substrates that can be directly coated with the PCN films, but the reactive nature and fast corrosion processes of the iron elements in the steel dictate a pretreatment step to prevent unwanted molecular interactions which lead to large area film defects. The passivation process can be accomplished by placing the (cleaned and degreased) steel substrate into a solution of very alkaline pH, wherein the concentration of base is high enough to ensure iron dissolution is prevented. The passivation solution also contains a simple chemical oxidant MX, where M=Li, Na, or K, and X=$NO_3$, $ClO_4$, $ClO_3$, $ClO_2$, or ClO. The oxidant is responsible for the conversion of the reactive metallic iron present on the surface to a thin stable oxide coating which is resistant to corrosion in the initial aqueous dip coating process. This passivation process is important to the integrity of the assembling PCN film, since without it the resulting film can have many large-scale defects. The presence of these defects will ultimately lead to corrosion of the underlying steel even before the coating process is completed. The effect of the passivation process on the resulting PCN film can be seen by comparing the images in FIG. 10A (without surface passivation) and FIG. 10B (with surface passivation).

After assembly of the PCN films, the polymer layers can be cross-linked together, forming an insoluble material that is more rigid and dense, thus increasing the mechanical strength and corrosion resistance of the films and rendering them less susceptible to swelling. The polymers can be cross-linked either by allowing sufficient time for a self-curing cross-link to proceed whereby proximal functional groups react with each other, or by the application of an external stimulus which drives the cross-linking reaction. This driving force can be applied heat or UV light which can either initiate the reaction or increase the kinetics of a self-curing reaction.

The chemical reactions shown in FIGS. 7 and 8 can cross-link the amine-containing cationic polymer, thus reducing the total amount of positive charge in the film. This will leave the largely negatively charged clay platelets, preventing negatively charge ions (such as $Cl^-$, $CO_3^{2-}$, $SO_4^{2-}$, $CN^-$ etc.) from easily diffusing to the surface of the steel. If un-inhibited, these complexing ions will increase the corrosion and dissolution rate of the iron. The platelets also create a mass transfer (gas diffusion) barrier preventing neutrally charged molecules, such as dissolved oxygen, from freely diffusing to the surface of the steel where the oxygen is electrochemically reduced, driving the corrosion process of iron.

Figure 11A:
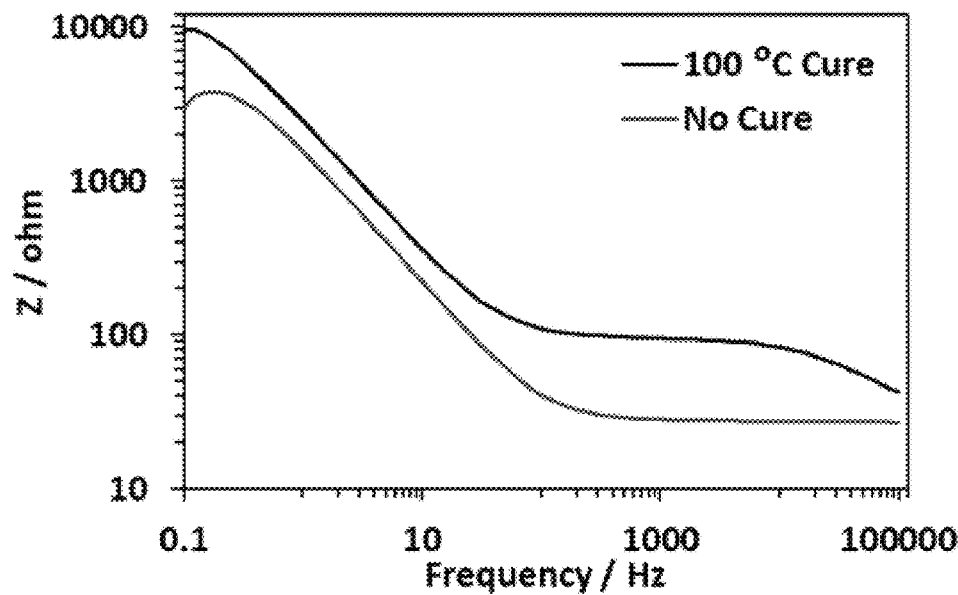
FIG. 11A is a Bode plot showing the differences in electrical impedance between samples coated with 40 BL of PCN film in 0.6 M NaCl solution at the start of the test. One sample has not been cured and was tested right after coating and the other sample was cured in a 100° C. oven for 12 hours.
Figure 11B:
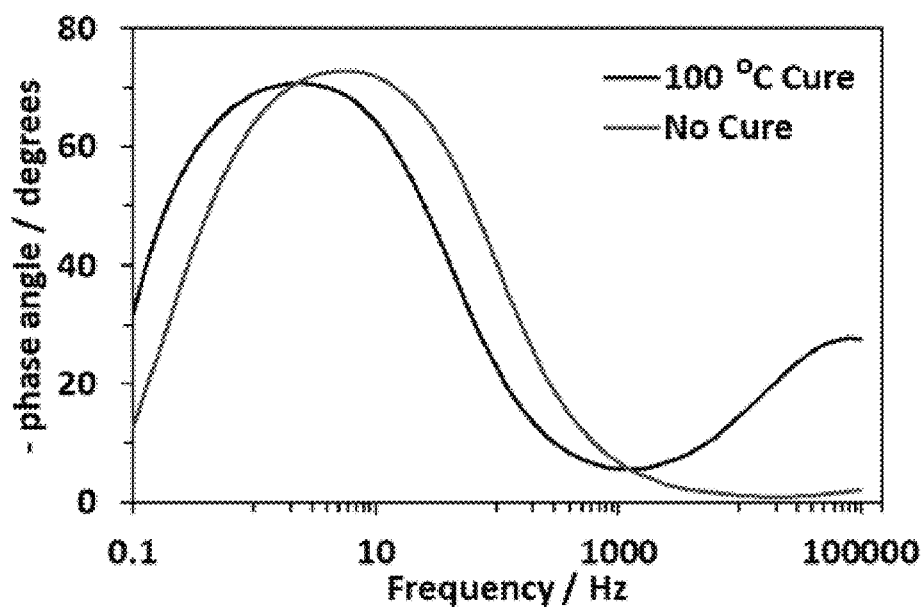
FIG. 11B is a plot showing the difference in phase angle between the same samples.

The post-deposition cross-linking of the functionalized polymers is very important for the corrosion resistant properties of the PCN coating, as can be determined from testing of the samples under corrosive conditions. Functionalized polymers were synthesized using EDA and DGEBD through the route shown in FIG. 7. These reagents were allowed to react and stopped when 50% cure was reached by dissolving in water (dissolving will dilute the polymer sufficiently as to slow the reaction until it has been coated onto the steel substrate). The functionalized polymer layers were cured through a heat treatment. The samples were placed in a 100° C. oven for 12 hours before testing or tested without heat curing. To test the corrosion resistance of the PCN films, the coated low carbon steel samples were placed in contact with a 0.6 M NaCl solution (simulated seawater) for 24 hours and the corrosion process monitored by EIS. The marked difference between a 40 BL film of functionalized epoxy and MMT that was cured at 100° C. for 12 hours (labeled "100° C. Cure") and an equivalent 40 BL that was not heat cured (labeled "No Cure") is shown in FIG. 11A. The non-cured coating does not improve the impedance of the steel, which exhibits nearly the same impedance as bare steel. However, the cured PCN film does show a nearly 5× increases in the impedance of the sample at the lowest frequency. Further verification of the effectiveness of the post-deposition heat treatment can be seen in FIG. 11B which shows the phase angle at different AC frequencies for the two different coated samples. The non-cured film shows only a single gaussian shaped peak at lower frequencies (centered at ~8 Hz) which is simply attributed to the oxide electrolyte interface. However, the heat-cured sample shows a similar low frequency (centered at ~2 Hz) but has an additional peak that can be seen at high frequencies (>1000 Hz). This high frequency peak is due to the cross-linked PCN coating and is what leads to the increase in impedance observed in FIG. 11A.

The present invention has been described as a cross-linkable nanocomposite corrosion coating. It will be understood that the above description is merely illustrative of the applications of the principles of the present invention, the scope of which is to be determined by the claims viewed in light of the specification. Other variants and modifications of the invention will be apparent to those of skill in the art.

We claim:

1. A method for depositing a nanocomposite anticorrosion coating on a corrodible metal, comprising
   depositing at least one bilayer on a surface of the corrodible metal, the bilayer comprising a layer of a functionalized cross-linkable polymer and a layer of dispersed and aligned platelet particles, wherein the functionalized cross-linkable polymer comprises a polymeric amine that is partially reacted with an epoxy resin to a specified conversion state; and cross-linking the functionalized cross-linkable polymer by self-curing, thermal heat curing, or light curing subsequent to depositing the at least one bilayer.

2. The method of claim 1, wherein the platelet particles comprise clay platelets.

3. The method of claim 2, wherein the clay platelets comprise montmorillonite, vermiculite, laponite, kaolinite, mullite, or mica.

4. The method of claim 1, wherein the platelet particles comprise alumina, $TiO_2$ nanosheets, MXenes, graphene, graphene oxide, boron nitride, or a layered double hydroxide.

5. The method of claim 1, wherein the corrodible metal comprises steel.

6. The method of claim 5, wherein the surface of the steel is passivated with a stable oxide coating prior to depositing the at least one bilayer.

7. The method of claim 1, wherein the corrodible metal comprises copper, brass, bronze, iron, zinc, aluminium, magnesium, silver, nickel, or alloys thereof.

8. The method of claim 1, wherein the depositing comprises a Layer-by-Layer deposition process.

9. The method of claim 1, wherein the depositing comprises a spray coating, tape casting, reel-to-reel, flexographic, gravure, or doctor blading deposition process.

* * * * *